July 31, 1945.   S. W. ALDERFER   2,380,373
METHOD OF HANDLING ELASTIC THREADS AND PRODUCTS THEREOF
Filed Feb. 9, 1944
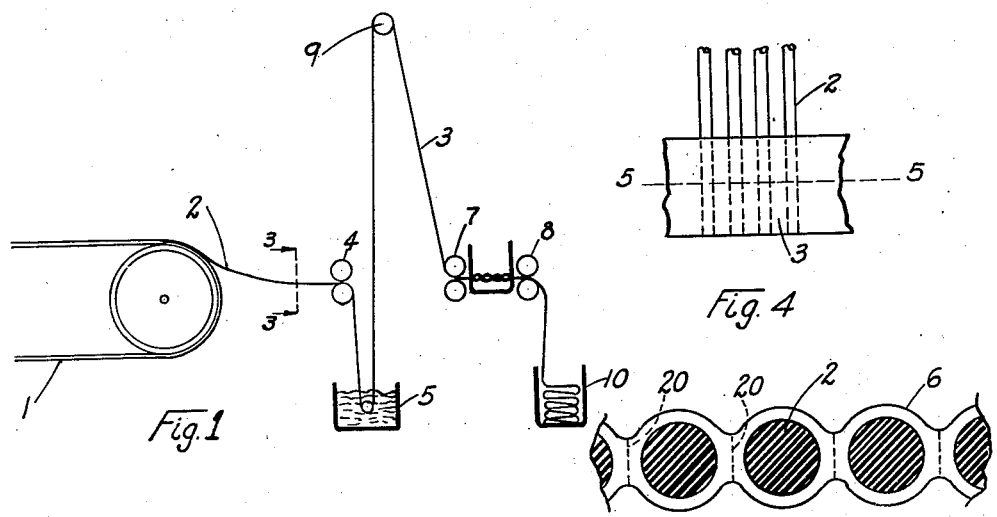
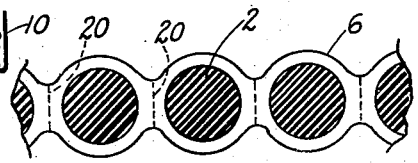
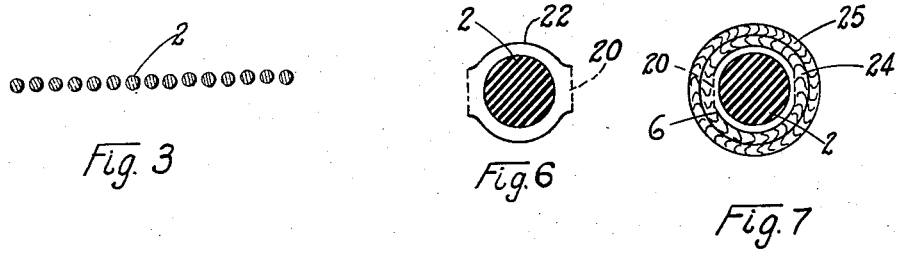
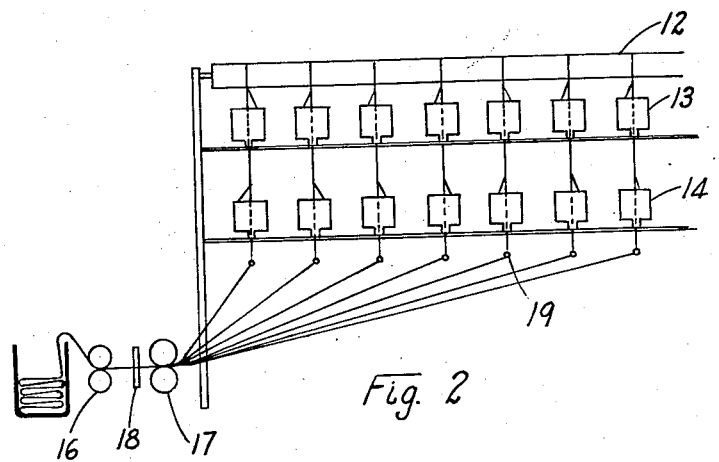
INVENTOR
STERLING W. ALDERFER
BY
ATTORNEYS Patented July 31, 1945

2,380,373

UNITED STATES PATENT OFFICE 2,380,373

METHOD OF HANDLING ELASTIC THREAD AND PRODUCT THEREOF

Sterling W. Alderfer, Akron, Ohio, assignor of one-half to Edward D. Andrews, Akron, Ohio Application February 9, 1944, Serial No. 521,731

7 Claims. (Cl. 57—149)

The present invention relates to the art of manufacturing elastic thread and covering it or incorporating it in fabrics for use in the fabrication of clothing, webs, belts, girdles and for any other purpose.

Elastic thread is ordinarily composed of a core of rubber with two layers of thread, either cotton, silk or artificial silk. The core may be made by cutting a sheet of rubber into a multiplicity of fine ribbons or strands or by slicing a stock of rubber sheets assembled as a block or wheel. Either process gives what is known in the trade as a "cut" rubber thread. Either of these methods requires that the sheets and threads be dusted with a material such as soapstone to keep the threads from sticking together in the subsequent handling. The film of adhesion preventing material will also prevent the outer covering from sticking to the core and this will result in a loose covering which is objectionable. If it is attempted to remedy this condition by coating the entire core with an adhesive before covering, the operation is very unsatisfactory due to the difficulties inherent in handling a sticky or adhesive material at or near the covering machines.

As a substitute for the cut rubber threads there have been developed processes for making the core from natural or artificial latex by extruding the latex as fine filaments into a bath of setting material. In still other processes rubber tapes have been rolled up to make the core. Processes such as these produce a thread or core which is dusted to prevent adhesion during the subsequent handling.

In the illustration which is given of the invention round threads or cores such as made by any of the latex extrusion methods are shown, but the process is equally applicable to cut threads or rolled threads and the results are equally beneficial with any type of elastic core.

It has also been a development in the arts to substitute rubber-like plastics as a core material but the same objections are present in the use of these materials. The invention is adaptable to such materials and it will be understood that this invention is not limited in any way to its application to rubber threads or cores, either cut or round.

In addition to the objections and disadvantages arising from the necessity of dusting the various types of elastic cores to prevent adhesion of the threads prior to the application of the outer jacket or covering, there is another very serious objection to existing processes. The cores are very delicate and easily stretched and it has been necessary in prior practices to package the threads before weaving or covering, usually by winding individual threads on spools or beams for mounting in the covering or weaving machines. This spooling operation, even if performed with the greatest care, will distort and elongate the threads and the product will vary greatly in strength, size and elasticity. Variations may appear in any one thread or different threads will exhibit the effects of non-uniform handling. Either result will evidence itself in non-uniformity of product. It has always been a problem to handle these individual strands of rubber from the time that they are produced until they are finally covered or incorporated in woven or knitted fabrics.

The process illustrated and described herein will obviate these major objections in the manufacture of elastic thread or elastic fabrics. The elastic threads or cores are so handled and treated that the possibility of creating non-uniformity in an individual thread or between a multiplicity of threads which are being covered at the same or different times will be eliminated. Also the cores are provided with adhesive areas or bands to which the covering will adhere. This is a particularly valuable property of the material, especially when silk or an artificial silk is used which has no nap to assist in holding the covering in position on the core.

While the process is illustrated as applied to the covering of the threads by wrapping the covering material around the thread in an ordinary spindle covering machine, the cover may be applied on a braiding machine. As a further adaptation of the invention the cores may be fed to a weaving or knitting machine if the elastic thread is to be incorporated directly in belts, tapes, or other fabrics.

It will therefore be understood that the particular embodiment of the invention which has been selected for illustration is illustrative only and that the process is adaptable for the other operations which have been suggested. Indeed, it may be adapted to an even wider range of commercial adaptations in the broad field of the textile arts, all without altering or modifying the scope or purview of the invention, or departing from its basic principles.

In the drawing in which the adaptation of the invention more specifically set forth above is shown;

Fig. 1 is a view showing the first steps of the process where a multiplicity of elastic threads are made into a sheet or ribbon;

Fig. 2 shows the later steps of the process by which the ribbon of elastic thread is separated into its component threads which are led directly to an ordinary spindle covering machine;

Fig. 3 is a section taken on the line 3—3 of Fig. 1 showing a multiplicity of round threads such as made by the latex extrusion process and before they are subjected to the first treatment;

Fig. 4 is a view of a fragment of the material which is produced by the first step in the precess;

Fig. 5 is a cross section, greatly enlarged, showing the temporary material on the line 5—5 of Fig. 4;

Fig. 6 is an enlarged view of an individual thread after being torn apart from its companions, and ready to enter a covering machine or loom; and Fig. 7 is a cross section of a completely covered elastic thread having two oppositely turned layers of covering thread around it.

In the drawing 1 represents an off-bearing belt such as is commonly employed to convey a plurality of round rubber threads 2 made by any of the well known extrusion processes. Any desired number of threads may be formed simultaneously but for the puposes of obtaining a more efficient operation of the present invention as illustrated it is desirable to extrude the threads in multiples of twenty for the reason that almost all spindle type covering machines are made in multiples of twenty. From the belt 1 the threads pass through a pair of guiding rolls 4 located over a bath 5 containing a relatively thin, viscous adhesive such as a rubber or latex cement. As the threads are arranged in closely spaced relation the adhesive will coat the individual threads and adhere them together as a continuous mat or sheet. The resultant sheet of parallel elastic threads or cores now indicated by the numeral 3 is shown in Figs. 4 and 5, the coating being indicated by the numeral 6. Usually the coating only partially fills the gaps between adjacent threads as indicated in the drawing.

While a rubber or latex cement is preferred it is possible to substitute any other suitable adhesive for the coating bath, but a rubber cement is preferred as it will have sufficient body to hold the parallel unconnected threads in sheet form and will also provide a tacky or sticky area on each thread when the sheet of material is torn apart into the individual threads.

From the bath 5 the threads, now in the form of a sheet held together by the coating of adhesive, passes upwardly and over a festooning device indicated by the numeral 9, and thence to two pairs of guiding rolls 7 and 8. During the passage from the bath 5 to the rolls 7 the sheet of cords will dry and set sufficiently so that the sheet will retain its sheet-like form. This drying operation will substantially reduce the tackiness of the surfaces but will not have extended to the interior of the sheet so that the cement is still quite tacky beneath the surface and will tear apart or separate easily.

To prevent the surfaces of the sheet from adhering to one another, a dusting box is located between the rolls 7 and 8 and the sheet may be twisted as indicated so as to expose all of the surfaces to the dusting material. The sheet of partially dried threads and adhesive is collected in a box 10.

The sheet 3 is now taken to the point where the elastic threads are to be covered or incorporated in a fabric. In Fig. 2 a standard spindle type covering machine is indicated by the numeral 12, the two spindles for covering an individual thread applied with oppositely directed turns of covering thread being indicated at 13 and 14.

The next step of the process is to divide the sheet of rubber into its individual threads and to lead these threads directly to the points at which they are to be covered or incorporated in an elastic fabric. For this purpose the sheet 3 is led to pinch rolls at which the sheet is torn apart. As shown in Fig. 2 two pairs of pinch rolls 16 and 17 may be employed, the second pair of which may be driven at a slightly greater surface speed so as to exert a slight tension in the sheet. This is indicated by showing the rolls 17 as slightly greater in diameter than the rolls 16. Between the rolls 16 and 17 is shown a comb, usually formed of a series of fine parallel wires which are located between the threads and cut the adhesive midway of the threads. The comb may be omitted and the threads torn apart by hand and led to the individual spindles, and they will be torn apart by the drag exerted by the covering machine, but a comb will insure more even division of the sheet into its individual component threads. Each thread 2, now again separated from its neighbors is led through guiding means indicated as 19.

In Fig. 5 the several lines of division between the individual threads is indicated by the dotted lines 20. When the threads are divided each thread (except those at the edges of the sheet) will have two strips or bands 20 in which the fresh sticky surface of the adhesive is exposed and two non-adhesive bands 22. The edge or selvage threads will, of course, have a single tacky band, but this will be sufficient to adhere the covering to the thread.

When the covering is applied as indicated by the numerals 24 and 25, the inner covering 24 will adhere to the tacky areas 20 and be held firmly in its position on the core. This will give a non-slipping jacket about the cores and obviate the objection of loose coverings. As the freshly exposed adhesive is tacky at room temperatures, it is not necessary to heat the thread or fabric after the covering operation in order to secure adherence of the covering to the thread.

It will be seen that not only does the process provide a simple and effective means for eliminating loose jackets or covering on the thread, but at no time during the handling of the thread preparatory to the covering is there any unequal tension or strain exerted on any individual thread. Therefore, there can be no variation in the tension of the individual thread or in different threads. The threads are all as uniform as they were when first formed and no variations in tension are created from that time until they are subsequently separated and used. With present methods due to stretching or handling of the strands between the time they are completed and the instant they are covered or incorporated in a finished fabric considerable variations may occur. There is, therefore, an especially valuable result achieved by the invention for it enables the manufacturer to handle the most delicate and fragile elastic filaments without breakage, stretching or unequal distortion.

It will also be noticed that the product is new and useful, for so far as known, no elastic thread with one or two stripes or areas of fresh sticky adhesive has been made heretofore. The covered thread is also structurally new.

The invention therefore resides, both in the process of handling rubber threads so as to maintain their original uniformity to the point of covering or weaving, and also in the resultant product.

Instead of forming the unconnected threads in a single layer as a sheet, a multiple layer sheet may be employed or even a bundle of the threads may be made up with an adhesive. In any case the elastic filaments are unconnected except for the surrounding body of adhesive.

What is claimed is:

1. A process for use in the manufacture of elastic fabrics, comprising arranging a plurality of elastic filaments in closely adjacent parallel relation, applying an adhesive to the filaments in sufficient quantity to hold the filaments together, partially drying the adhesive, and then separating the filaments while the interior of the adhesive is in tacky condition.

2. A process for use in the manufacture of elastic fabrics, comprising arranging a plurality of elastic filaments in closely adjacent parallel relation, coating said filaments with a viscous adhesive in sufficient quantity to hold the filaments together as a sheet, rendering the surfaces of the sheet non-adhesive, and separating the sheet into its individual filaments while the coating below the surface is in tacky condition.

3. The process of handling elastic filaments in the manufacture of elastic textile materials, comprising assembling a multiplicity of filaments in parallel relation, applying a viscous adhesive which will maintain them in fixed relation and setting the exposed surface of the adhesive, then subdividing the mass into individual filaments each having an exposed strip of unset adhesive.

4. The process of manufacturing elastic textile material, comprising arranging a plurality of elastic filaments in closely spaced parallel relation, coating said filaments with a viscous adhesive which will hold the filaments in sheet form, drying the outer surfaces only of the sheet, subdividing the sheet into individual filaments along lines between the filaments so as to expose an area of tacky adhesive on each filament, and then applying a covering to the individual filaments.

5. An elastic filament and a coating surrounding the filament, said coating having a longitudinally located stripe which is soft and tacky at room temperatures and an area which is non-tacky.

6. An elastic filament and a coating surrounding the filament, said coating having a portion which is non-tacky and a longitudinally located stripe which is soft and tacky at room temperatures, and a textile covering about said filament and adhered thereto by the stripe of tacky coating.

7. An elastic filament and a coating surrounding the filament, said coating having a portion which is non-tacky and a longitudinally located stripe which is soft and tacky at room temperatures, and a wrapping of thread surrounding the filament and adhered thereto by the tacky portion of the coating.

STERLING W. ALDERFER.